United States Patent [19]

Stricker

[11] Patent Number: 5,224,436
[45] Date of Patent: Jul. 6, 1993

[54] MULTIFUNCTION HYDRODYNAMIC AND BUOYANT HULL EXTENSION FOR PLANING WATER CRAFT

[76] Inventor: John G. Stricker, 871 Highland Ave., Annapolis, Md. 21403

[21] Appl. No.: 770,399

[22] Filed: Oct. 3, 1991

[51] Int. Cl.$^5$ .......................... B63B 1/24; B63B 1/26; B63B 1/00; B63B 1/22
[52] U.S. Cl. .................................. 114/274; 114/271; 114/284
[58] Field of Search ............... 114/271, 274, 284, 285, 114/56, 283

[56] References Cited

U.S. PATENT DOCUMENTS

| | | | |
|---|---|---|---|
| 1,752,406 | 4/1930 | Wetch | 114/285 |
| 1,782,320 | 11/1930 | Scott-Paine . | |
| 1,855,076 | 4/1932 | Warner | 114/284 |
| 2,985,130 | 5/1961 | Jacobs | 114/285 |
| 3,016,864 | 6/1960 | Woodfield | 114/284 |
| 3,019,755 | 2/1962 | Diamond | 114/66.5 |
| 3,763,810 | 10/1973 | Payne | 114/285 |
| 4,519,336 | 5/1985 | Mason | 114/286 |
| 4,619,215 | 10/1986 | Wood et al. | 114/56 |
| 4,690,094 | 9/1987 | Taylor | 114/284 |
| 4,813,365 | 3/1989 | Lindstrom et al. | 114/56 |
| 4,840,589 | 6/1989 | Breaux | 440/89 |
| 4,843,988 | 7/1989 | Clement | 114/56 |
| 4,864,948 | 9/1989 | Guttler | 114/39.1 |
| 4,903,626 | 2/1990 | Haines | 114/56 |
| 4,951,591 | 8/1990 | Coles | 114/284 |

OTHER PUBLICATIONS

Clement, E. P., and Blount, D. L., "Resistance Tests of a Systematic Series of Planing Hull Forms", presented at the Annual Meeting of the Society of Naval Architects and Marine Engineers (Nov. 14 and 15, 1963), pp. 491-579, New York, 1964.

Primary Examiner—Joseph F. Peters, Jr.
Assistant Examiner—Kenneth Lee
Attorney, Agent, or Firm—Howard Kaiser; Gary G. Borda

[57] ABSTRACT

A hull extension is attached at an appropriate distance above the hull bottom surface to the stern of a planing water craft so as to be at least partially submerged at subplaning speeds and totally unsubmerged at planing speeds, effectively increasing hull length at subplaning speeds while not affecting hull length at planing speeds. A "step" effect is thus featured whereby the hull extension is not in contact with the water once planing commences. Hydrodynamic and buoyant efficiency is increased by the hull extension at subplaning speeds and unaffected thereby at planing speeds. The hull extension also offers practical utility in terms of providing additional protection, deck space and mounting area.

14 Claims, 6 Drawing Sheets

MULTIFUNCTION HYDRODYNAMIC AND BUOYANT HULL EXTENSION FOR PLANING WATER CRAFT

The invention described herein may be manufactured and used by or for the Government of the United States of America for governmental purposes without the payment of any royalties thereon or therefor.

BACKGROUND OF THE INVENTION

The present invention relates to hull adjuncts for water craft, more particularly hull adjuncts which improve hydronautics or enhance utility or safety for planing water craft such as outboard motor boats and other power craft.

Many water craft, notably power craft, utilize hulls which are designed to hydroplane ("plane") upon attainment of sufficient speeds to overcome gravity-dominated water fluid flow regimes. While in the planing mode of operation (i.e., at higher speeds) the water craft operates on the water surface with most of the lift force provided by hydrodynamic rather than buoyant effects. In the subplaning mode of operation (i.e., at lower speeds) lift is provided for the craft by combined buoyant and hydrodynamic forces; in this regime drag forces are high and large amounts of energy are ultimately expended in the bow wave and wake.

Conventional planing craft have hulls which are designed for efficiency and stability in the planing mode but which are less efficient in the subplaning mode; indeed, many hulls designed for efficient planing operation are markedly inefficient at lower speeds.

A relevant hull design criterion with regard to performance of planing hulls is the length-to-beam ratio (i.e., $L_H/B_H$, wherein $L_H$=length and $B_H$=width or "beam"), which is the ratio of the hull length $L_H$ to the hull width $B_H$. Generally speaking, hull efficiency at subplaning speeds increases with increasing $L_H/B_H$, and, conversely, hull efficiency at planing speeds decreases with increasing $L_H/B_H$.

An instructive study which was published in 1964 by the Society of Naval Architects and Marine Engineers explored various parameters affecting performance of planing hulls; these parameters included length-to-beam ratio, relationship between hull size and gross weight, and location of the longitudinal center of gravity ("LCG"). See Clement, E. P., and Blount, D. L., "Resistance Tests of a Systematic Series of Planing Hull Forms," presented at the Annual Meeting of the Society of Naval Architects and Marine Engineers (Nov. 14 and 15, 1963), New York, 1964. These model tests demonstrated, inter alia, that an increase in hull length of about 8 percent generally results in an overall reduction in resistance of about 20 percent, and that transition from the low speed mode to planing operation occurs at Froude numbers of about 1.5.

Froude number $F_\nabla$ is defined as $$F_\nabla = \frac{v}{(g\nabla^{\frac{1}{3}})^{\frac{1}{2}}} \quad (1)$$

where v is speed in feet per second, g is acceleration due to gravity, and $\nabla$ is volume of displacement at rest. At $F_\nabla=1.5$, drag normally is near peak value, and speed increases beyond that transition value typically bring about a reduction of hull drag until a minimum value occurs at about $F_\nabla=2.0$ or beyond.

The following curve fit expression may be developed from the Clement-Blount data and considered to mathematically represent the general behavior of modern planing hulls in terms of drag-to-weight ratio D and the above-noted three parameters:

$$D=(1.81\times 10^{-7})(20.8-y)^2(80.9+z)^2(x)^{-0.68} \quad (2)$$

where x is the length-to-beam ratio L/B; y is the ratio $A/\nabla^{\frac{2}{3}}$, wherein A is the planing bottom area; and z is the distance, expressed as a percentage of length L, of the longitudinal center of gravity ("LCG") from the centroid of area A. Values for x generally range between 2.0 and 6.0 inclusive, for y between 5.5 and 10.0 inclusive, and for z between 4.0 and 12.0 inclusive.

Drag-speed equations and power-speed equations may be derived from Eq. (2) as follows:

$$D \simeq K_d v^2/w_o \quad (3)$$

and $$P \simeq K_p v^3/w_o \quad (4)$$

where D is the drag-to-weight ratio, P is the power-to-weight ratio, $K_d$ is the drag constant, $K_p$ is the power constant, v is the speed of the water craft in feet per second, and $w_o$ is its weight.

$L_H/B_H$ values for planing craft hulls are typically between about 2.5 and 5.0, with many such hulls designed using $L_H/B_H$ values in the 2.8 to 3.3 range. These hull designs are efficient at planing speeds but are wasteful of energy at subplaning speeds. Increasing the $L_H/B_H$ value for a given craft hull by increasing hull length l and/or decreasing hull width b will increase hull efficiency at subplaning speeds, in some cases significantly so. The aforenoted published series tests of Clement and Blount demonstrated, for example, that an 8 percent increase in hull length for a typical planing hull design having an $L_H/B_H$ of 3.0 and a specific loading coefficient of 8.5 results in an overall reduction in resistance of about 20 percent during the subplaning mode of operation. However, increasing the $L_H/B_H$ value thusly will decrease hull efficiency at planing speeds, since more power will generally be needed for a craft with a higher $L_H/B_H$-ratio hull than for a craft with a lower $L_H/B_H$-ratio hull, in order to travel at like planing speeds.

In addition to the aforementioned considerations regarding hull efficiency, typical planing water craft may be lacking in other areas, as well. Users of such craft often require or desire additional deck space in order to enable or facilitate activities such as fishing, swimming and diving. Moreover, navigational safety is of paramount concern for boatmen and passengers and other seafarers and mariners. A specific safety need for a typical planing craft is means of protection from or mitigation of craft damage or personal injury due to collision with natural or architectural formations or structures or with other water craft.

OBJECTS OF THE INVENTION

In view of the foregoing, it is an object of the present invention to provide a planing water craft hull extension which increases hull efficiency at subplaning speeds without decreasing hull efficiency at planing speeds.

It is a further object of the present invention to provide a planing water craft hull extension which increases deck space utility of the craft.

Another object of this invention is to provide a planing water craft hull extension which has a safeguarding effect against damage and injury to person and property due to impact of the craft with other entities.

SUMMARY OF THE INVENTION

The present invention provides a hull extension for a planing water craft, a water craft wherein at least a portion of the craft hydroplanes when the craft is moving at planing speeds relative to water. The hull extension comprises at least one generally rectilinearly and/or curvilinearly shaped structural adjunct which is attached generally contiguously to the stern of the hull of the craft at a tangible distance above the bottom of said hull. Each adjunct extends generally rearwardly from the stern of the hull of the craft, albeit that, in many embodiments, at least one adjunct is characterized in one or more ways by obliqueness in the vertical direction, fore-to-aft horizontal direction, and/or port-to-starboard horizontal direction.

When the craft is moving at subplaning speeds relative to the water, the extension is located at least partially below the surface of the water, and acts to increase the hydrodynamic and buoyant efficiency of the craft. When the craft is moving at planing speeds relative to the water, the extension is located entirely above the surface of the water, and does not decrease or otherwise affect the hydrodynamic and buoyant efficiency of the craft. Each adjunct is attached to the stern with the lower junctional edge, defined by the junction of general contiguity of the adjunct lower surface with the stern, located a sufficient distance above the bottom of the hull, such that the adjunct is at least partially submerged at subplaning speeds and totally unsubmerged at planing speeds.

The hull extension of the present invention thus affords hydrodynamic and buoyant lift force at low speed (subplaning) operation. The hull extension is mounted to the stern, the rear part of the craft, in a generally rearward direction, for many embodiments preferably mounted to the transom portion of the stern. The extension is fastened or secured (for some embodiments easily detachably so) by any appropriate means, including but not limited to, adhering, bolting, screwing, clamping, pinning, seaming, nailing, hooking, cabling, latching, locking and/or riveting. By mounting the hull extension an appropriate distance above the hull bottom surface, a step effect is brought about whereby the hull extension is not in contact with the water once planing commences.

This invention thus primarily features efficacious placement of a stern-mounted hull adjunct so as to be fully or partially submerged at subplaning speeds and be completely unsubmerged and above the water surface at planing speeds. The ensuing major advantage is the effective increase in hull length (and therefore hull $L_H/B_H$ value) at subplaning speeds, without any effective change whatsoever in hull length (and therefore hull $L_H/B_H$ value) at planing speeds. Hull efficiency is benefitted (by virtue of increased $L_H/B_H$) at subplaning speeds without an accompanying incurred detriment to hull efficiency at planing speeds.

In accordance with many embodiments of this invention for typical planing hulls, effective hull length at subplaning speeds is increased by about 6 to 10 percent, with resultant significant drag reductions. The hull wetted area loading factor is decreased at subplaning speeds, further reducing drag. Drag is even further reduced, and operating trim angle is also reduced, as a consequence of the rearward shift of the longitudinal center of buoyancy by about 2 to 6 percent for subplaning operation.

Drag reductions result in fuel savings. Also, since less power and thrust are required to achieve planing, a less powerful and therefore lower-weight engine may be used, and the propulsion system itself can be reevaluated and propitiously redesigned so as to emphasize planing speed operation and deemphasize transition speed operation.

Integration of the hull extension with the hull at the stern, for example with the transom and hull bottom, results in a construction which is well suited to support of a person or persons, serving as a step or platform for swimmers, divers, mariners, piscators and other partakers of nautical pleasures and activities. This support construction admits of incorporation of a tread surface of any of a variety of available non-skid materials.

This hull extension/hull construction in accordance with the present invention is preferably rigid and can be detachably or permanently installed. Because of its structural strength the present invention can serve to protect transoms, propulsion lower units and other parts of the craft from damage and the voyagers from injury due to impact with objects such as piers, seawalls and other vessels, especially while berthed. To this end the hull extension can be fitted or incorporated with an energy-absorbant bumper.

For outboard motor-powered hulls, the hull extension of this invention can be conveniently incorporated or integrated with a motor mounting bracket. This approach has a concomitant advantage of effectively mitigating or eliminating a common drawback of this type of mounting, viz., that of shifting the longitudinal center of gravity rearward relative to the hull center of buoyancy to an extent that significantly increases drag at subplaning speeds.

The step feature of the present invention brings the concomitant practical advantage of obviating the need for flush fitting of the extension with hull contours, thus facilitating its implementation as an accessory to water craft.

Other objects, advantages and features of the present invention will become apparent from the following detailed description of the invention when considered in conjunction with the accompanying drawings.

BRIEF DESCRIPTION OF THE DRAWINGS

In order that the present invention may be clearly understood, it will now be described, by way of example, with reference to the accompanying drawings, wherein like numbers indicate the same or similar components, and wherein.

DETAILED DESCRIPTION OF THE INVENTION

Figure 1:
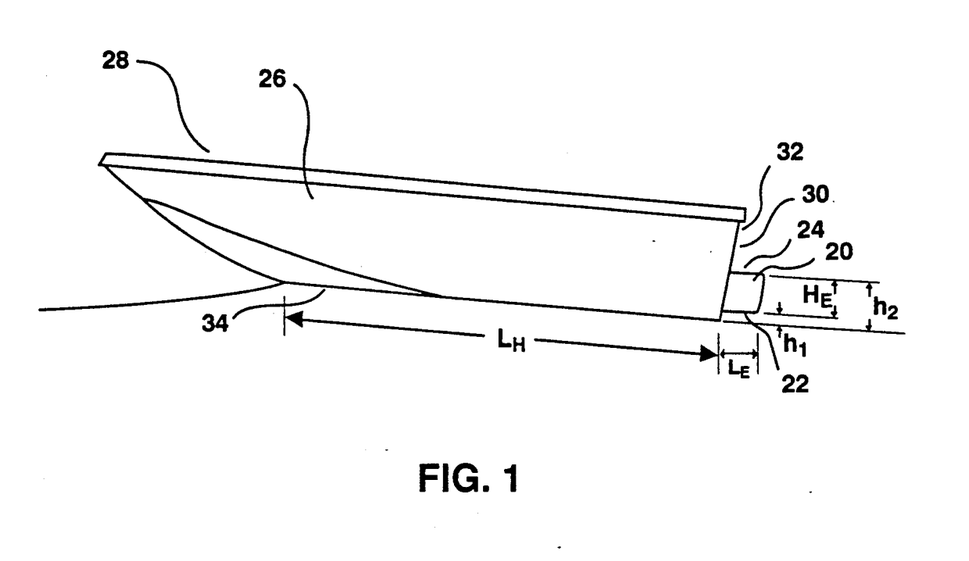
FIG. 1 is a side elevational view of a typical planing water craft, to which is attached at the stern a hull extension in accordance with the present invention.
Figure 2:
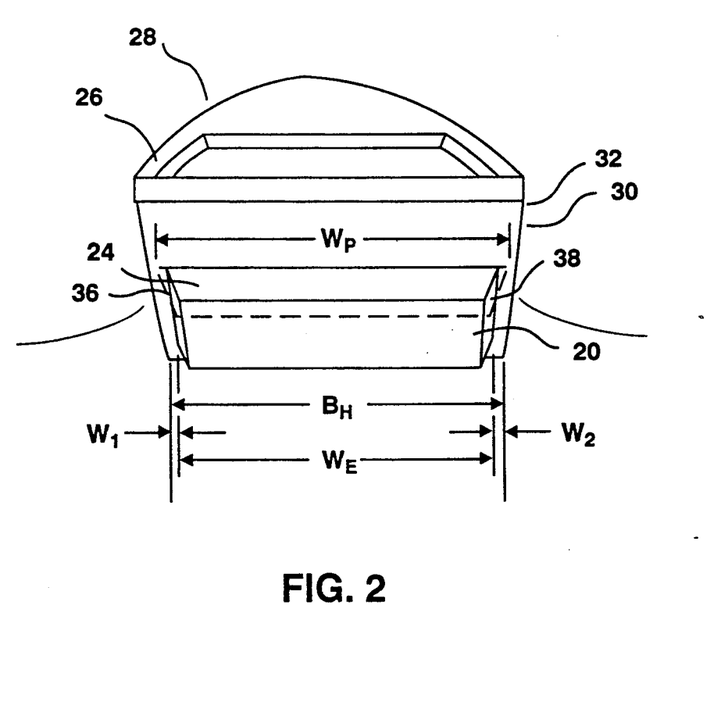
FIG. 2 is a rear perspective view of the craft and hull extension shown in FIG. 1.

Referring now to FIG. 1 and FIG. 2, hull extension 20 having lower extension surface 22 and upper extension surface 24 is attached to hull 26 of water craft 28 at hull transom 30 of hull stern 32. Water craft 28 as shown is square-sterned, having flat transom 30; it is emphasized, however, that the present invention is applicable to and appropriate for planing water craft having any of an infinite number of hull shapes and sizes. Hull 26 has hull length $L_H$ and hull beam width $B_H$.

Figure 3:
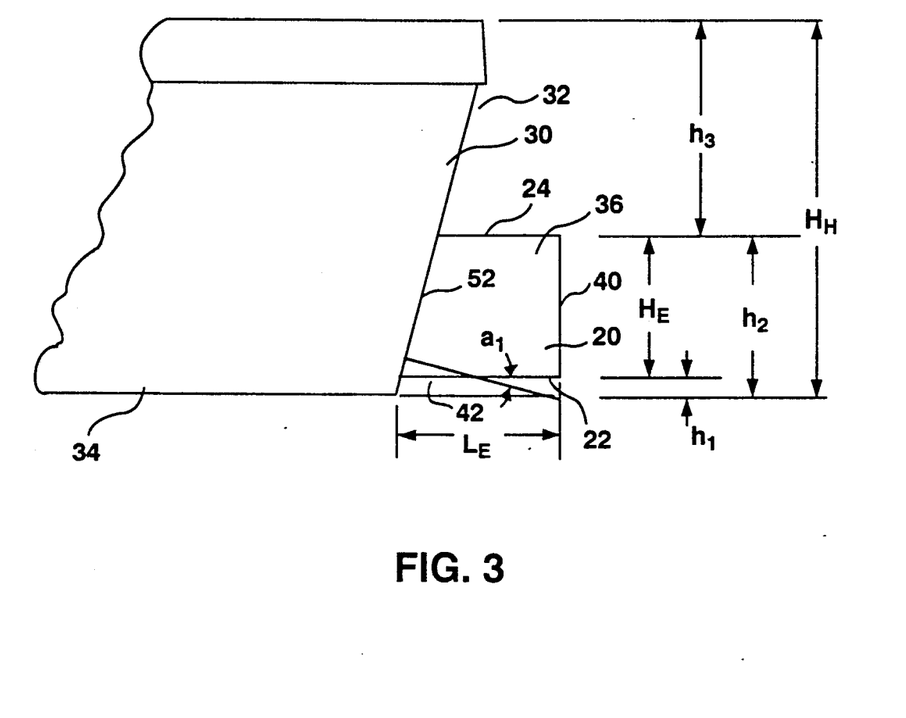
FIG. 3 is a fragmentary side elevational view of the craft and hull extension shown in FIG. 1.
Figure 4:
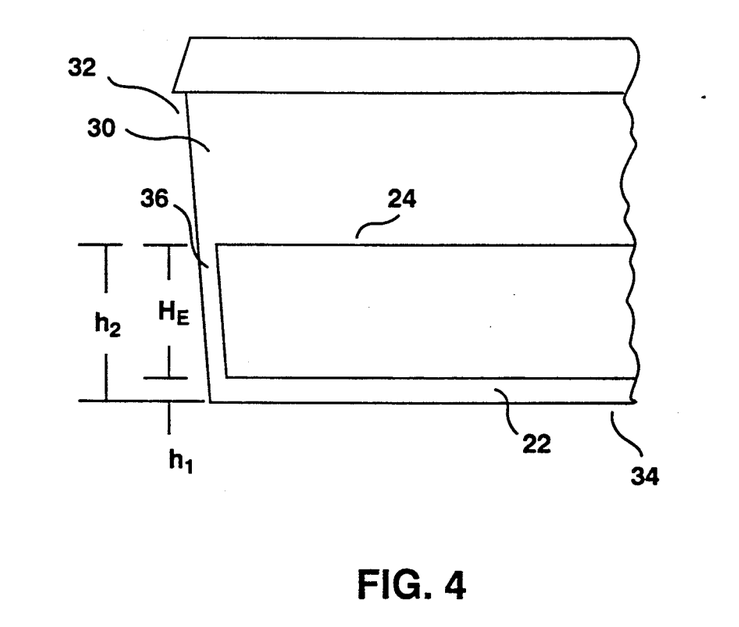
FIG. 4 is a fragmentary rear elevational view of the craft and hull extension shown in FIG. 1.

With reference to FIG. 3 and FIG. 4, lower extension surface height $h_1$ is the vertical distance between lower extension surface 22 and hull bottom surface 34. Upper extension surface height $h_2$ is the vertical distance between upper extension surface 24 and hull bottom surface 34. For many embodiments of the present invention distances $h_1$ and $h_2$ are preferably measured from the outermost aft bottom surface of hull bottom surface 34. Extension height $H_E$ is the vertical distance between upper extension surface 24 and lower extension surface 22, this distance $H_E$ equaling the difference $h_2 - h_1$. Extension width $W_E$, shown in FIG. 2, is the horizontal distance between left extension side surface 36 and right extension side surface 38. Extension length $L_E$ is the horizontal distance between transom 30 and extension back surface 40.

Lower extension surface 22 is preferably flat and parallel or generally parallel to hull bottom surface 34 near the transom 30 intersection; in some embodiments, however, a downangled flat lower extension surface 42 having lower extension downangle $a_1$ with respect to the horizontal or generally horizontal plane defined by hull bottom surface 34 would provide more lift and might improve performance.

Figure 5A:
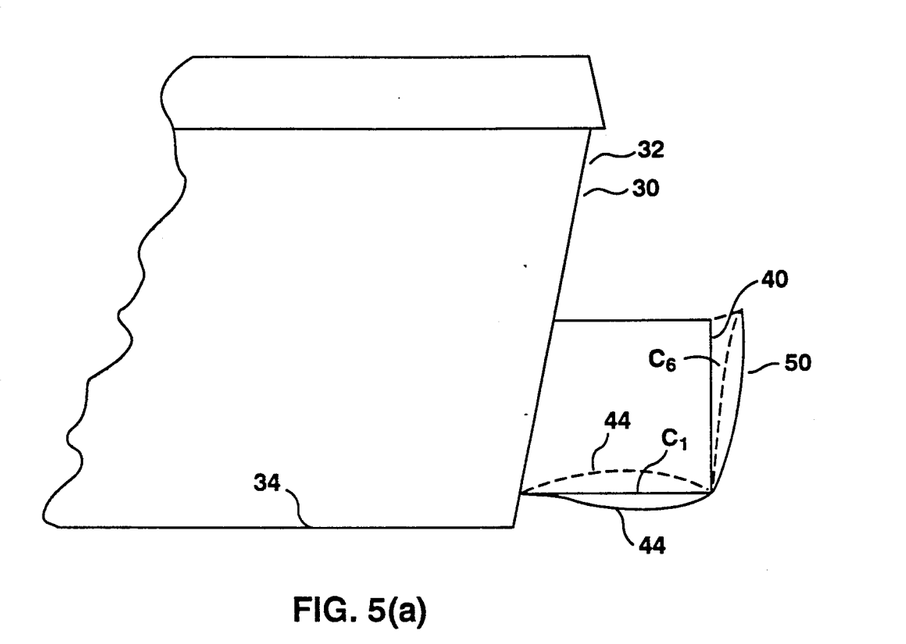
FIG. 5(a) and FIG. 5(b) are fragmentary side elevational views of the craft, similar to the view shown in FIG. 3, to which is attached at the stern a vertically curved hull extension in accordance with this invention.
Figure 5B:
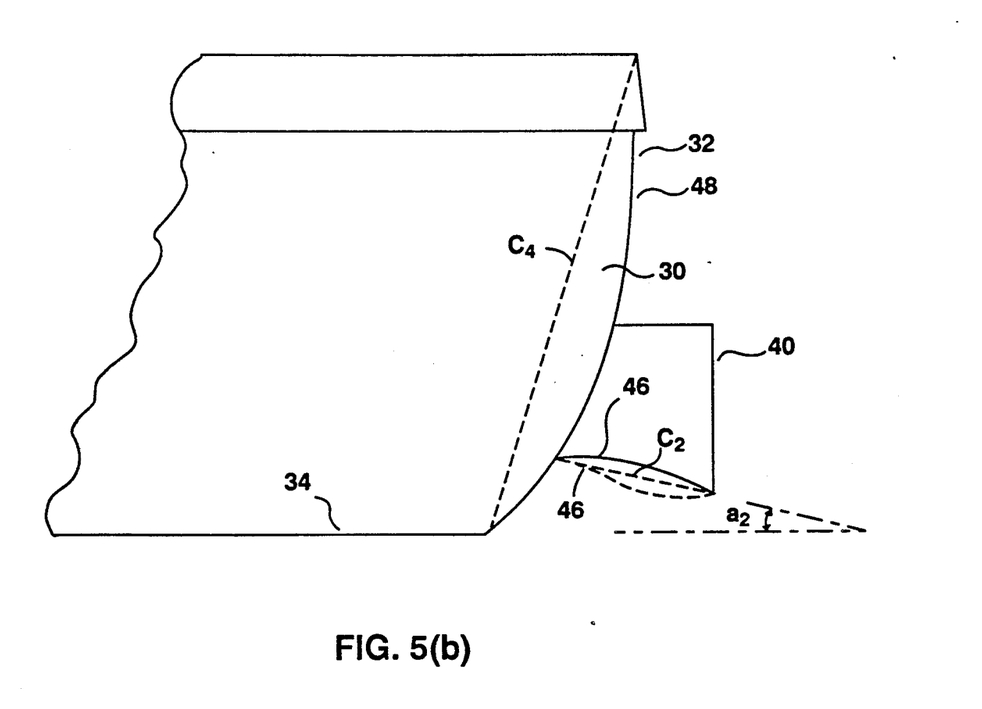

Moreover, lower extension surface 22 need not be flat but in fact can be of any shape in accordance with the present invention. Any shape for lower extension surface 22 which provides changes in lift and/or drag and/or influences the speed at which planing operation commences is suitable according to this invention. For example, reference now being made to FIG. 5, (a) and (b), curved lower extension surface 44 is convexly and-/or concavely cambered with mean chord line $c_1$ horizontal or generally horizontal, i.e., parallel or generally parallel to hull bottom surface 34 near the intersection therewith of transom 30. Downangled curved lower extension surface 46 has mean chord line $c_2$ downangled with respect to the plane defined by hull bottom surface 34 at a downangle $a_2$.

Extension back surface 40 is preferably flat and parallel or generally parallel to flat transom 30 in a horizontal direction and at some angle with respect to flat transom 30 in a vertical direction, although in some embodiments of this invention extension back surface 40 is preferably parallel to flat transom 30 in the vertical direction as well—i.e., extension back surface 40 defines a plane which is parallel or generally parallel to the plane defined by flat transom 30.

Figure 6:
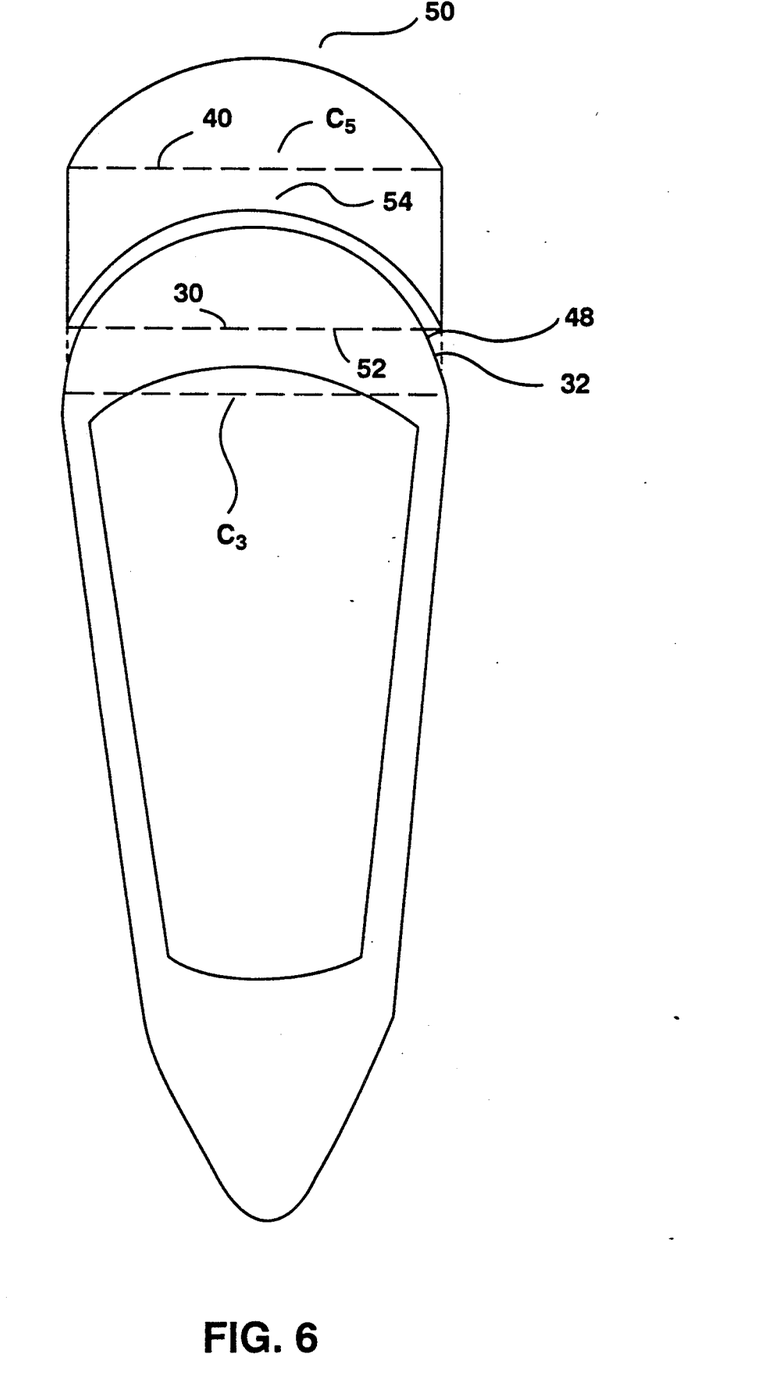
FIG. 6 is a top plan view of a planing water craft having a horizontally curved stern, to which is attached a hull extension in accordance with this invention.

Referring to FIG. 6 and again to FIG. 5, the hull transom is not flat transom 30 but horizontally and/or vertically curved transom 48. Flat extension back surface 40 is preferably parallel or generally parallel to the horizontal mean chord line $c_3$ for horizontally curved transom 48, as shown in FIG. 6, and is preferably parallel to or angled with respect to the vertical mean chord line $c_4$ for vertically curved transom 48, as shown in FIG. 5. Alternatively, curved extension back surface 50 defines a mean chord line $c_5$ in the horizontal direction which is preferably parallel or generally parallel to mean chord line $c_3$ for curved transom 48 or which is preferably parallel or generally parallel to flat transom 30 in the horizontal direction. In the vertical direction, curved extension back surface 50 defines a mean chord line $c_6$ which is preferably parallel or angled with respect to flat transom 30.

Extension front surface 52 is preferably flat and hugs flat transom 30. Curved extension front surface 54 is preferably used for and hugs curved transom 48. More generally, the shape defined by extension front surface 52 or curved extension front surface 54 should conform with and be situated in close proximity to the shape defined by flat transom 30 or curved transom 48, as the case may be, to the maximum extent practicable. It is desirable to minimize spacing between the transom and the extension back surface and thereby minimize consequent adverse hydrodynamic and/or bouyant effects.

Reference now being made to FIG. 7 and again to FIG. 2, a more complexly shaped hull extension 20 having extension back surface 40 incorporates extension platform 56 having extension platform height $H_P$, extension platform width $W_P$, and extension platform length $L_P$. Extension platform length $L_P$ exceeds extension length $L_E$, and/or extension platform width $W_P$ exceeds extension width $W_E$. This overlap serves to further the sitting/standing area function of hull extension 20. To this end extension platform tread 58 is often advantageously placed upon upper extension surface 24, for hull extension 20 with or without extension platform 56, so as to cover an appropriate surface area thereof. Extension platform tread 58 is made of a material, such as but not limited to a rubberized material, which promotes traction, friction and/or adhesion. Extension platform height $H_P$ may be a factor to consider in determining sufficiency of sturdiness of extension platform 56 for supporting reasonable and desired weight to be placed upon upper extension surface 24. Extension length $L_E$ and extension width $W_E$ are optimized for hydrodynamic purposes, while platform length $L_P$ and platform width $W_P$ are optimized for utility purposes.

Upper extension surface height $h_2$ preferably maintains upper extension surface 24 at or above the static water line, but in some embodiments of this invention upper extension surface 24 is below the static water line. Water craft 28 will ride higher in stern 32 at low speeds if upper extension surface 24 is not below the water line, which drops as the speed of water craft 28 increases.

Figure 9:
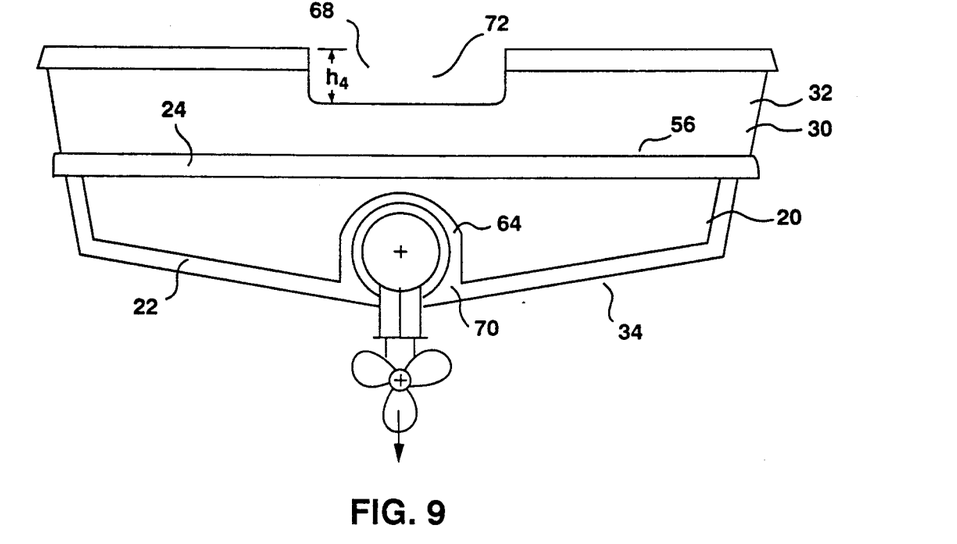
FIG. 9 is a rear elevational view of the craft shown in FIG. 1, to which is attached at the stern a hull extension having a clearance tunnel in accordance with this invention.
Figure 10:
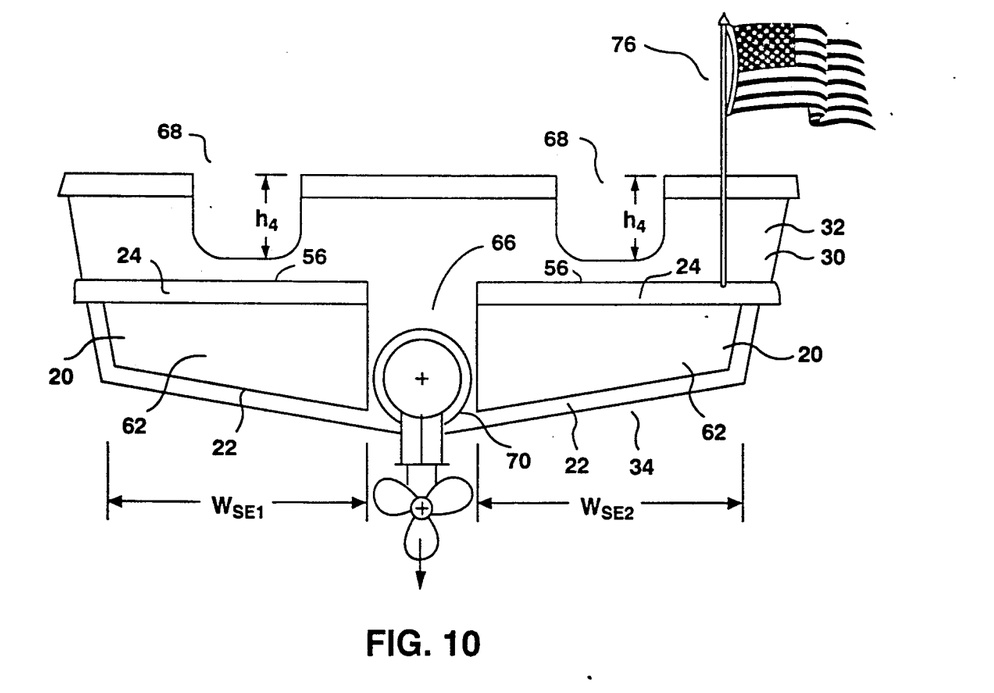
FIG. 10 is a rear elevational view of the craft, similar to the view shown in FIG. 9, to which is attached at the stern a split hull extension in the form of two adjacent hull subextensions in accordance with this invention.

Upper height differential $h_3$, as shown in FIG. 3, is the difference between hull transom height $H_H$ and upper extension surface height $h_2$; i.e., $h_3 = H_H - h_2$. A practical consideration with regard to upper height differential $h_3$ is facility of passage between the hull 26 area and the extension 20 area. For some embodiments of this invention at least one access opening 68 is provided in hull transom 30 in order to effectively decrease, at each access point, upper height differential $h_3$ to step-over height $h_4$, as shown in FIG. 9 and FIG. 10. Some embodiments provide transom cutout 72, which facilitates operation of an outboard motor or other propulsion unit 70. For some embodiments cutout 72 doubles as access opening 68.

Lower extension surface height $h_1$ is optimized in accordance with other dimensions of hull 26 and extension 20 as well as ambient traveling conditions. For some embodiments of the present invention, lower extension surface height $h_1$ is expected to be about 0.5 to 1.0 percent of hull length $L_H$. Another general guideline, applicable to some embodiments of this invention, is that lower extension surface height $h_1$ may be expected to be some ten percent of extension length $L_E$. This value for $h_1$ is also dependent upon wave heights and lengths. The ultimate consideration and objective with regard to lower extension surface height $h_1$ is assurance of unwetting at planing speeds. For any embodiment and application of the present invention, an optimum value for lower extension surface height $h_1$ exists. Lower extension surface height $h_1$ should be small enough to minimize drag but large enough to prevent wave striking and to allow good ventilation—i.e., flow of air into the gap formed by $h_1$ as the speed of water craft 28 increases toward that where planing begins.

Referring again to FIG. 2, width semi-differential $\omega$ is the difference on one side between hull beam width $B_H$ and extension width $W_E$. Width semi-differential $w_1$ is on the port side of water craft 28; width semi-differential $w_2$ is on the starboard side. Assuming a medial positioning of extension 20 with regard to the sides of hull 26, then $w_1 = w_2 = (B_H - W_E)/2$. For most embodiments of this invention neither width semi-differential $w_1$ nor width semi-differential $w_2$ should exceed about 5 percent of hull beam width $B_H$; $w_1$ and $w_2$ should each range between 0 and 5 percent of $B_H$. Maximum effectiveness of hull extension 20 is with $w_1 = w_2 = 0$. This zero value for both width semi-differentials $w_1$ and $w_2$ may be difficult to attain for some embodiments and applications in view of manufacturing limitations and other practical considerations; nevertheless, a small value for each of $w_1$ and $w_2$ should have only a minor or negligible impact on performance.

Figure 8:
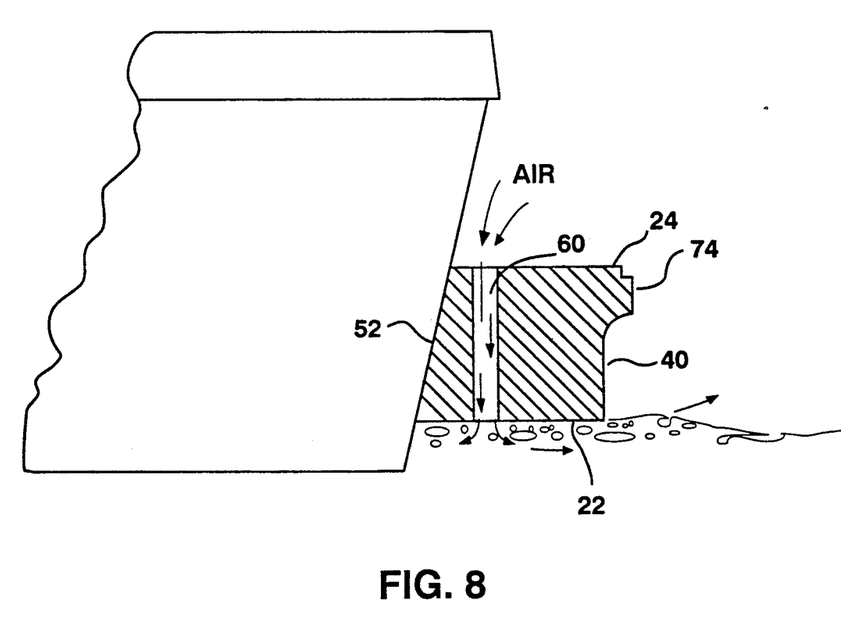
FIG. 8 is a fragmentary side elevational view, similar to the view shown in FIG. 7 and partially in section, illustrating utilization of an air tube in the hull extension of the present invention.

One or more ventilation conduits are provided in hull extension 20 for many embodiments of this invention in order to ensure unwetting or ventilating at a desired speed. With reference to FIG. 8, for example, hull extension 20 has air tube 60 for conducting airflow directionally as shown and thereby promoting ventilation. Use of at least one ventilation conduit such as air tube 60 for these embodiments allows a reduced lower extension height $h_1$ to be used; this, in turn, has the beneficial effect of reducing low speed drag even further, more appreciably so for some of these embodiments.

Reference again being made to FIG. 9 and FIG. 10, some embodiments of the present invention allow for and provide room for mounting of equipment in or on hull stern 32. This rear-mounted equipment includes, but is not limited to, one or more outboard motors, outdrives, waterjets, other propulsion units, and any combinations thereof. Extension 20 in FIG. 9 is a full-width tunneled extension having extension clearance tunnel 64 which accommodates propulsion unit 70 which is centrally mounted on transom 30. In such embodiments tunneled extension 20 has at least one appropriately located extension clearance tunnel 64. Extension 20 in FIG. 10 is a split extension which includes a port subextension 62 and a starboard subextension 62. In such embodiments split extension 20 is divided into a plurality of appropriately located extension gap 66 between a pair of subextensions 62.

Split extension 20 having a plurality of extension gaps 66, or tunneled extension 20 having a plurality of extension clearance tunnels 64, is a preferred embodiment for many applications. For example, some water crafts 28 utilize twin outboards, outdrives or waterjets, fitted to hull transom 30. For such applications split extension 20 has three subextensions 62 appropriately separated and spaced apart with two extension gaps 66 constituting these two separations and providing room for the two propulsion units to be mounted within the spaces provided by the extension gaps 66; here, split extension 20 is generally a port subextension 62, a starboard subextension 62, and a medial subextension 62. Alternatively, tunneled extension 20 has two extension clearance tunnels 64 which similarly accommodate the two propulsion units within the spaces provided by the extension clearance tunnels 64. Any number of extension gaps 66 can be provided for split extension 20, and any number of extension clearance tunnels 64 can be provided for tunneled extension 20, in accordance with the present invention. Moreover, any number, kind and combination of propulsion or accessory units for water craft 28 can be accommodated by split extension 20 or tunneled extension 20.

Some embodiments of extension 20 are purposely asymmetrical or unbalanced in hydrodynamic and buoyant effect in order to correct, counteract or compensate for an existing condition pertaining to water craft 28. For example, hull 26 may be loaded so that a list results due to uneven port-starboard weight distribution. In such cases, extension 20 may be mounted and/or configured so as to correct this condition and thereby provide a level port-starboard attitude. Full-width extension 20 can be mounted at an angle, i.e., obliquely with respect to hull bottom surface 34, so that lower extension surface height $h_1$ increases linearly, either from port side to starboard side or from starboard side to port side. Rather than mount extension 20 in an inclined fashion, extension 20 can instead be configured with lower extension surface 22 at an incline. In order that upper extension surface 24 not be at a non-horizontal incline similar to that of lower extension surface 22, which would thus compromise utility of upper extension surface 24, preferred embodiments of this invention would appropriately angle lower extension surface 22 obliquely in a lateral direction with respect to upper extension surface 24 while at the same time maintaining upper extension surface 24 in a generally horizontal position. If extension 20 is a split extension such as that shown in FIG. 10, this compensatory purpose can similarly be accomplished by mounting at least one subextension 62 at an appropriate angle and/or utilizing at least one subextension 62 which has a generally horizontal upper extension surface 24 and a lower extension surface 22 angled obliquely in a lateral direction with respect to generally horizontal upper extension surface 24.

For applications involving outboard motor-powered hulls 26, extension 20 in some embodiments of this invention incorporates a motor mounting bracket attached to extension 20 for mounting this kind of propulsion unit 70 directly upon extension 20. The bracket can provide the same versatility, such as a motor height adjustment feature, as that provided by currently available or conventional motor mounting brackets. At the same time, extension 20 of this invention provides low-speed lift and buoyancy characteristics which counteract drag and stability penalties which are normally associated with the rearward weight shift caused by this bracket motor mount.

More generally, for many applications of this invention extension 20 may serve as a convenient or suitable location for attaching or incorporating equipment, mechanisms, accessories or items of any kind. Any number, kind and combination of such items may be attached to upper extension surface 24, lower extension surface 22, left extension side surface 36, and/or right extension side surface 38. These include, but certainly are not limited to, propulsion units, trim tabs and other hydrodynamic devices, masts, and fishing poles and other fishing equipment. By way of example, in FIG. 7 and FIG. 8 extension 20 has attached thereto a protective layer, bumper 74, which covers portions of extension back surface 40, left extension side surface 36 and/or right extension side surface 38. As a further example, seen mounted upon upper extension surface 24 of right subextension 62 in FIG. 10 is flagpole 76, proudly displaying the American flag.

Figure 7:
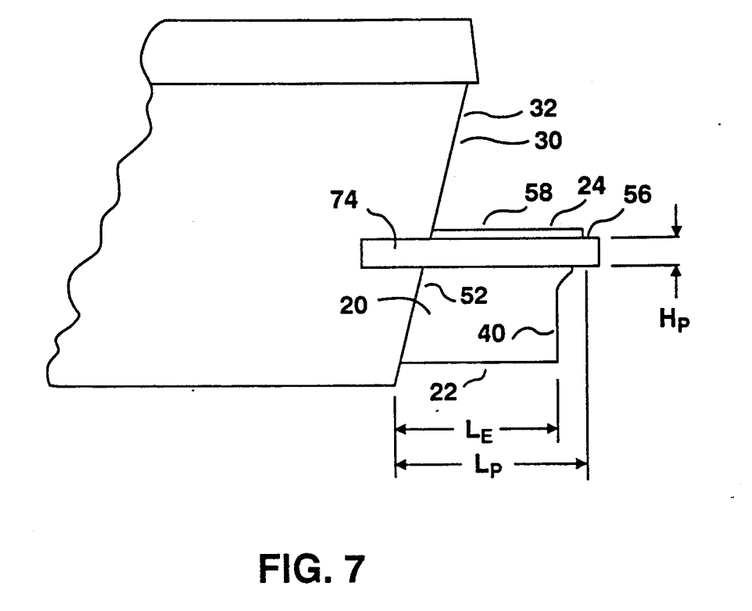
FIG. 7 is a fragmentary side elevational view of the craft, similar to the view shown in FIG. 3, to which is attached at the stern a hull extension with hull extension platform and bumper in accordance with this invention.

Utilization of bumper 74 in the manner shown in particular in FIG. 7 exemplifies the protective function, especially of transom 30 and propulsion unit 70, which the present invention can additionally serve. Bumper 74 is preferably made of a suitable protective and/or energy-absorbing material such as a rubberized material; it is attached to or incorporated into the surface of extension 20 at desired locations. In some embodiments bumper 74 is strategically located near and along the upper borders of side surfaces 36 and 38 and back surface 40; in those embodiments which utilize extension platform 56 bumper 74 advantageously surrounds, partially or completely, side surfaces 36 and 38 and back surface 40 along the periphery of platform 56. Instead of attaching or incorporating bumper 74 along extension 20 surfaces, some embodiments of this invention provide an extension 20 which is itself designed as an integral unit having sufficient strength characteristics to furnish this protection.

Extension 20 is made of any of a multitude of materials. The two subextensions 62 which were used for the tests discussed below herein were made of foam-filled material. Extension 20 is solid in some embodiments and hollow in others. A hollow extension 20 often represents a significant increment in volume and hence is advantageously designed, in accordance with this invention, to serve as storage space for fuel, water or other items. Much of this added volume described by extension 20 is normally below the static waterline and therefore has a diminished effect on the static trim of water craft 28.

Tests were conducted using a 12-foot fiberglass power boat having a flat transom, stepped deadrise hull and 4-horsepower outboard motor. Using Eq. (2), hereinabove, drag-to-weight ratio D was first calculated for the test boat, test water craft 28, having hull 26 without extension 20 attached, and again calculated for test water craft 28 having hull 26 with extension 20 attached. Without extension 20 attached, test water craft 28 had an initial hull chine length $L_H$ of about 10 feet, an average beam $B_H$ of about 3 feet, a total weight of about 400 pounds including driver, and a longitudinal center of gravity about 12 percent aft of the centroid of the planing area. Based on these values, the three parameters—viz., length-to-beam ratio x, planing-bottom-area-to volume-of-displacement relationship y, and LCG distance z—were determined with some approximation as follows: $x=3.3$; $y=9.0$; $z=12.0$. These parameters yielded a calculated value of drag-to-weight ratio $D=0.097$ for the subject hull 26 without extension 20 attached.

The extension 20 which was used for these tests had an extension length $L_E$ of 9 inches, thus resulting in an overall effective hull length L of 10.75 feet. This extension 20 was in fact a split extension 20, of the kind shown in FIG. 5, consisting of two identical subextensions 46—a port subextension 46 and a starboard subextension 46—each subextension 46 having an extension height $H_E=6$ inches and a subextension width $W_{SE1}=W_{SE2}=12$ inches; hence, the sum total of the widths of both subextensions, $W_{SET}$, was 24 inches, where $W_{SET}=W_{SE1}+W_{SE2}$. Both subextensions 46 together effectuated an extension width which was approximately equal in lateral expanse $W_E$ to the hull beam width $B_H$ of about 3 feet, but which failed to cover about a one-foot middle portion, about 35 percent, of this three-foot beam width $B_H$ ($B_H$ being approximately equal to the width of transom 30). Based on new values introduced by incorporation of extension 20, the Eq. (2) parameters were determined to be approximately as follows: $x=3.55$; $y=9.68$; $z=8.0$. These parameters yielded a calculated value of drag-to-weight ratio $D=0.075$ for hull 26 with extension 20 attached. This represented a predicted 23 percent improvement at the full speed operating point in both total drag and power, as calculated by Eq. (2), for the modified hull (hull 26 plus extension 20) having extended hull length $L_{HE}$ (where $L_{HE}=L_H+L_E$), as compared with the unmodified hull (hull 26) having hull length $L_H$.

For the tests extension 20 was positioned with lower extension surface height $h_1$ equal to one inch, $h_1$ measured with hull bottom surface 34 considered to be the outermost aft bottom surface of hull 26, a stepped deadrise hull; hence, $h_2=H_E+h_1=7$ inches. Water was smooth and winds very light for all test conditions. A throttle positioning device was installed in order to assure precise power settings for runs made with and without the hull extension of the present invention. Drag and power differences were measured by recording elapsed times to travel a fixed course on a protected tidal water creek. Fastest run times were on the order of one minute, giving roughly calculated top speeds of 7 to 8 miles per hour, or slightly below planing speed.

Based on calculations using Eq. (3) and Eq. (4), set forth hereinabove, results of these tests demonstrated reductions in power and drag at about 8 miles per hour of about 18 percent, as compared with calculated reductions pursuant to Eq. (2) of about 23 percent. These slight discrepancies may be explained by a couple of factors beside standard measurement inexactitude and error.

Firstly, extension 20 covered only about 65 percent of beam width $B_H$, whereas a drag calculation based on Eq. (2) presupposes an extension 20 which continuously and completely (or virtually completely) spans beam width $B_H$—i.e., an extension 20 having an idealized extension width $W_{IE}=W_{SET}$ as distinguished from a qualified extension width $W_{QE}=W_{SET} \angle W_{IE}$. Extension width $W_E$ is the distance from the extreme left side of the leftmost subextension to the extreme right side of the rightmost subextension. Any number N of subextensions 46 can constitute extension 20; hence, $W_{SET}=W_{SE1}=W_{SE2}\ldots W_{SEN}$, where $W_{SE1}$ is the first subextension width, $W_{SE2}$ is the second subextension width, and so on up to and including final subextension width $W_{SEN}$. If the number N of subextensions is one, then extension 20 is constituted by that single subextension 46, and $W_E=W_{SET}$; if extension 20 virtually completely spans beam width $B_H$, then $W_E=W_{SET}=W_{IE}$. Total-subextension-width-to-beam-width ratio $R=W_{SET}/B_H$ thus equaled about 0.65 for these tests. Eq. (2) assumes an R value approaching 1.00.

Moreover, hull extension 20, in accordance with the present invention, must be raised above hull bottom surface 34 a certain lower extension surface height $h_1$ in order to assure unwetting at planing speeds. This step effect is expected to increase drag at subplaning speeds somewhat beyond the Eq. (2) predictions.

It is emphasized that this step feature is an essential aspect of the hull extension in accordance with the present invention, vital to its proper functioning. Lower extension surface height $h_1$ provides a step which prevents wetting of extension 20 at planing speeds. There is an additional practical advantage of the step feature of the present invention. Extension 20 thereby admits of ease of design and use as an added-on boat accessory without need for smooth fairing or finishing flush with hull bottom surface 34 or hull 26 side contours.

Production hull extensions may reasonably be expected to improve upon the above-noted 0.65 value for total-subextension-width-to-beam-width ratio R. R values of 0.75 to 0.95 or higher should be feasible for most embodiments and practical applications of the hull extension of the present invention. Potential reductions in drag and power at subplaning speeds on the order of 20 percent or greater are thus concluded to be attainable for this invention when applied to a typical modern planing hull, assuming proper design and effectuation of the stepped hull extension system in accordance with this invention.

Accordingly, the present invention principally provides reduction of drag of planing hulls when operating at speeds which are insufficient for planing. For typical hull designs, drag reductions at subplaning speeds of 20 percent or greater are predicted. Fuel consumption at subplaning speeds will be reduced by roughly similar percentages, with minor variations dependent on engine characteristics.

Since typically a significant part of the total operating cycle for a planing water craft is at low speeds, substantial fuel savings may be anticipated for a planing water craft which utilizes the hull extension of the present invention. For example, assume the following operating profile for a recreational planing boat of about 250 horsepower. The boat is operated a total of 50 hours per year at 12 miles per hour for one-third of the total miles traveled and 36 miles per hour for two-thirds of the total miles traveled; i.e., the boat travels a total of 1,080 miles per year with 720 of those miles operated at 36 miles per hour and 360 of those miles operated at 12 miles per hour. As for fuel, such boats typically use 2.2 miles per gallon of fuel at both 12 miles per hour and at 36 miles per hour. Fuel consumption is directly proportional to drag at a given speed. With drag reduced by 20 percent at low speeds, it is seen that a yearly fuel savings of about 7 percent, or about 34 gallons per year, is realized for this operating profile. This estimate performed for a similarly powered commercial craft logging 600 hours of operation per year yields a fuel savings of about 400 gallons per year.

Furthermore, in accordance with this invention less thrust and power are required to reach the speed of transition to planing operation. This reduction in the requisite amount of thrust to achieve planing allows utilization of a less powerful engine than would otherwise be required to achieve planing, with consequent savings in fuel and/or engine weight. Moreover, this reduced thrust allows a beneficial shift in priority in terms of propulsion design. The propeller or other propulsion means may be designed with greater emphasis on effectiveness at planing speeds and lesser emphasis on effectiveness at the transition speed; hence, by employing a hull extension in accordance with the present invention, greater planing speed capabilities and further fuel savings at planing speeds are possible for an engine of a given power.

Other embodiments of this invention will be apparent to those skilled in the art from a consideration of this specification or practice of the invention disclosed herein. Various omissions, modifications and changes to the principles described may be made by one skilled in the art without departing from the true scope and spirit of the invention which is indicated by the following claims.

What is claimed is:

1. For a planing water craft wherein at least a portion of the hull of said craft hydroplanes when said craft is moving at planing speeds relative to water, a hull extension comprising:
   at least one structural adjunct which is attached generally contiguously to the stern of said hull;
   at least one said adjunct being hollow, thereby forming a fluid-tight chamber;
   each said adjunct extending generally rearwardly from the stern of said hull;
   each said adjunct having an upper surface, a lower surface and at least one side surface extending therebetween and wherein said lower surface of each said adjunct is located a tangible distance above the bottom surface of said hull;
   whereby each said adjunct is located at least partially below the surface of said water when said craft is moving at subplaning speeds relative to said water, thereby effectively increasing the length of said hull at subplaning speeds, and each said adjunct is located entirely above said surface of said water when said craft is moving at planing speeds relative to said water;
   whereby said hull extension increases the hydrodynamic and buoyant efficiency of said craft when said craft is moving at subplaning speeds and said hull extension does not affect the hydrodynamic and buoyant efficiency of said craft when said craft is moving at planing speeds.

2. A hull extension as in claim 1, wherein at least one said adjunct is generally rectilinearly shaped.

3. A hull extension as in claim 1, wherein at least one said adjunct is generally curvilinearly shaped.

4. A hull extension as in claim 1, wherein at least one said adjunct is shaped generally rectilinearly and curvilinearly.

5. A hull extension as in claim 1, wherein said hull extension comprises one said adjunct.

6. A hull extension as in claim 1, wherein said extension comprises a plurality of said adjuncts.

7. A hull extension as in claim 1, wherein at least one said adjunct has at least one ventilation conduit for promoting unwetting of said lower surface of each said adjunct at planing speeds.

8. A hull extension as in claim 1, wherein said lower surface of at least one said adjunct has at least one hollow formed therein to provide a clearance tunnel for accommodating at least one propulsion unit.

9. A hull extension as in claim 6, wherein at least one gap exists between at least two said adjuncts, and at least one said gap is utilized for accommodating at least one propulsion unit.

10. A hull extension as in claim 1, wherein said stern has at least one access opening for facilitating passage between said hull and said extension.

11. A hull extension as in claim 1, wherein said stern has at least one cutout for facilitating operation of at least one propulsion unit.

12. A hull extension as in claim 1, wherein at least one said adjunct includes a platform mounted to said upper surface of said adjunct wherein said platform provides a larger horizontal surface area than said upper surface of each said adjunct.

13. A hull extension as in claim 1, wherein at least one said adjunct includes a traction promoting surface mounted to said upper surface of each said adjunct for facilitating tread.

14. A hull extension as in claim 1, wherein at least one said adjunct includes a protective, energy-absorbing bumper attached to at least one of said sides of said adjunct.

* * * * *